P. Falker,
Clevis.

Nº 92,806.     Patented Jul. 20. 1869.

Witnesses                        Inventor.
Harry King                    P. Falker
J. H. Lehmann          per
                                  Alexander Mason
                                    Attys

UNITED STATES PATENT OFFICE.

PHILLIP FALKER, OF LANESVILLE, INDIANA.

IMPROVEMENT IN PLOWS.

Specification forming part of Letters Patent No. 92,806, dated July 20, 1869.

*To all whom it may concern:*

Be it known that I, PHILLIP FALKER, of Lanesville, in the county of Harrison, and in the State of Indiana, have invented certain new and useful Improvements in Plows; and I do hereby declare that the following is a full, clear, and exact description thereof, reference being had to the accompanying drawings, and to the letters of reference marked thereon.

The nature of my invention consists in application of certain devices to a plow, whereby I am enabled either to cut a wide or narrow furrow or a deep or shallow one, as will hereinafter be set forth and described.

Figure 1:
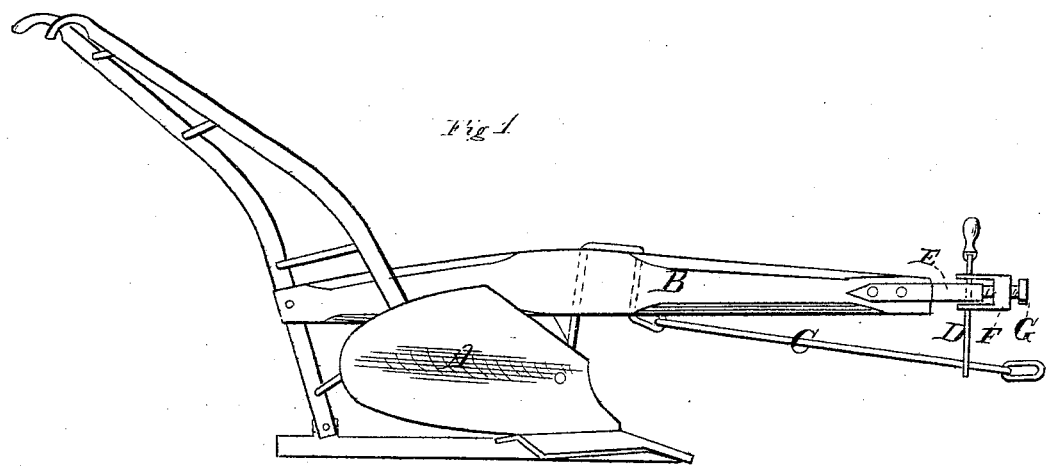
Figure 2:
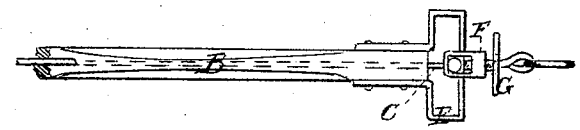

Figure 1 is a side elevation of my improvement. Fig. 2 is a plan view of the same.

Letter A represents an ordinary plow, to which my improvement is attached. Toward the back end of the beam B the draft-rod C is secured, and which extends forward and passes through a hole in the end of the upright bar D. Upon the end of the beam is the clevis E, which extends outward, and then is formed into an elongated square, running at right angles with the beam, as seen in Fig. 2. Upon the front side of this is attached a box-like frame, F, the top and bottom pieces of which extend backward over the front edge of the clevis, and have a slot cut through them, up through which the bar D passes. Extending through the box F there is a thumb-screw, G, or any suitable device, by means of which the box is forced backward, drawing the bar D tightly against the clevis, and thus holding it securely in place. By loosening the screw G this bar can be raised upward, so that the share will cut a shallow furrow; or it can be dressed so as to make it cut a deep one.

When it is desired to cut a narrow furrow, the draft-bar C is moved toward the landside of the plow by means of the bar D, and, when a wide one, toward the mold side.

Having thus described my invention, what I claim, and desire to secure by Letters Patent, is—

1. The arrangement of the clevis E, bar D, and box F, which is regulated to slide freely over the clevis, and is controlled by the screw G, as specified.

2. In combination with the box F, clevis E, and bar D, the bar C, when connected to a loop which passes from the under side of the beam over the top thereof, and passes back down through the beam and connected to the upright, as shown and described.

In testimony that I claim the foregoing I have hereunto set my hand this 9th day of April, 1869.

PHILLIP FALKER.

Witnesses:
J. S. PFRIMMER,
WILLIAM ZOLLMAN.